Nov. 18, 1924.

J. G. BERG 1,516,172

ADJUSTABLE MILLING CUTTER

Filed July 14, 1924

Witness
C. F. Wesson

Inventor
John G. Berg.
by attorneys
Southgate & Southgate

Patented Nov. 18, 1924.

1,516,172

UNITED STATES PATENT OFFICE.

JOHN G. BERG, OF WORCESTER, MASSACHUSETTS, ASSIGNOR TO LELAND-GIFFORD COMPANY, OF WORCESTER, MASSACHUSETTS, A CORPORATION OF MASSACHUSETTS.

ADJUSTABLE MILLING CUTTER.

Application filed July 14, 1924. Serial No. 725,756.

*To all whom it may concern:*

Be it known that I, JOHN G. BERG, a subject of the King of Sweden, residing at Worcester, in the county of Worcester and State of Massachusetts, have invented a new and useful Adjustable Milling Cutter, of which the following is a specification.

This invention relates to a milling cutter capable of use for many purposes, but especially adapted for use in cutting around the circumference or periphery of a part of a crankshaft rotating in front of it.

The principal objects of the invention are to provide a cutter of this type in which the blades are detachable and therefore replaceable and are also adjustable; to provide simple and effective but convenient way of adjusting the blades which will simultaneously move them forward and outward, all of them the same distance; to provide a form of holding head for the blades cooperating with the adjusting means so that they will be held firmly in adjusted position and cannot tilt or get out of adjustment; to provide simple means for clamping them in adjusted positions, and to provide a construction of blades each having two cutting edges at right angles to each other.

The invention also involves improvements in the details of construction and arrangements of parts as will appear.

Reference is to be had to the accompanying drawings, in which—

Figure 1:
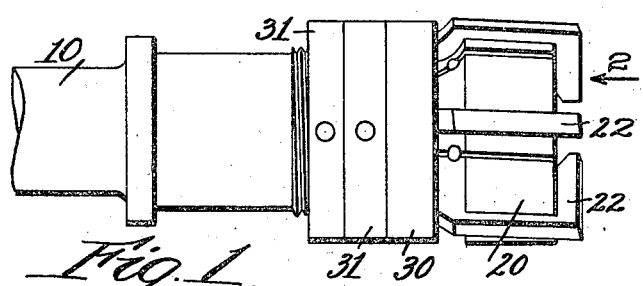
Fig. 1 is a side view of the end of a milling cutter constructed in accordance with this invention and showing it mounted on its spindle.
Figure 2:
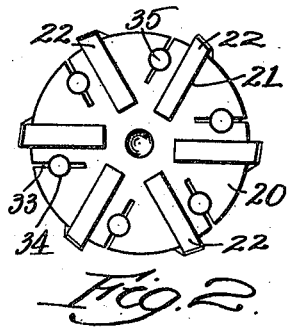
Fig. 2 is an end view of the cutter.
Figure 3:
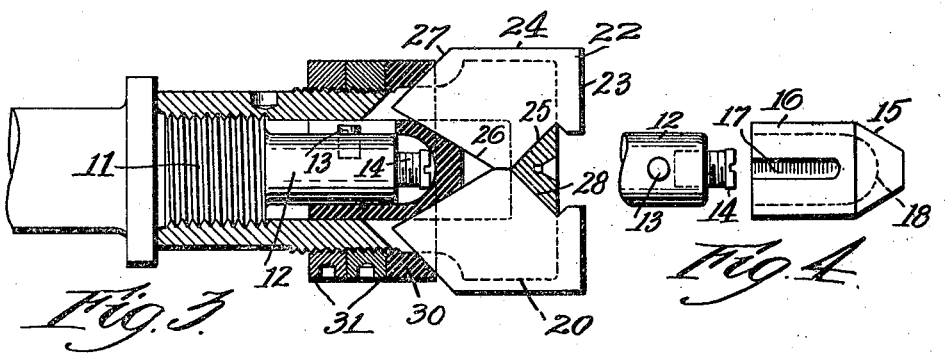
Fig. 3 is a longitudinal central sectional view of the cutter on its spindle.
Figure 4:
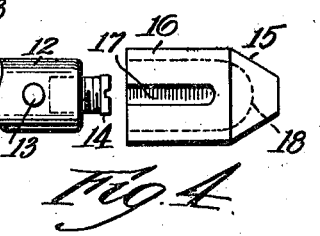
Fig. 4 is a side view of the inner holding cone and its associated parts on the spindle.

The cutter is intended, of course, to be mounted on the end of a spindle 10. This spindle is provided with a screw thread 11 and a cylindrical projection 12 beyond it. This projection is provided with a pin 13 fixed in position thereon and with a central longitudinal screw 14 in the end which is adjustable.

On the cylindrical end 12 of the spindle I locate a cone 15 which has a cylindrical part 16 with a longitudinal slot 17 for receiving the pin 13 and positively driving the cone from the spindle so that it will not slip. This cone is hollow and has a concave surface 18 inside against which the end of the adjusting screw 14 is adapted to bear. It will be seen that the longitudinal position of the cone will depend on the adjustment of the screw 14 as the other parts to be described force it back against it.

On the screw 11 a head 20 screws up into position against a flat surface on the spindle. This head is provided with a series of slots 21 arranged almost radially, that is, tangent to a very small central circle. They are not arranged parallel with the axis of the spindle but at an inclination for the purpose of enabling the cutters to engage the work at an inclination instead of having a broad side action. In these slots are placed the cutter blades 22. Each of these cutter blades has a flat cutting edge 23 on its end and a flat cutting edge 24 on its longitudinal outer edge at right angles thereto. Each one is also provided with three slanting surfaces 25, 26 and 27 arranged all of them preferably at an angle of 45° to the axis of the spindle and two of them parallel. The cutting edge 23 is shown as projecting inwardly beyond the outer point of the slanting surface 25 so as to get a wider cutting edge than would be possible otherwise. The several edges 23 are arranged to be in the same plane and that plane at right angles to the axis of the spindle. The several slots 21 are provided with conical inner surfaces 28 for engaging the slanting surfaces 25 on the cutters.

The cone 15 engages the surfaces 26 and it will be obvious that if the cone is adjusted outwardly toward the end of the head it will force the cutters out, causing their surfaces 25 to slide on the surfaces 28, enlarge the diameter of the cutter and bring the edges 23 farther from the end of the head.

In order to hold the cutting blades in this position a collar 30 is provided slidable on the shank of the head and having an internal conical surface at its outer end for engaging the surfaces 27 and locking them in their adjusted positions and preventing them from rocking or any other motion on the head. I have shown this collar as backed up by a couple of screw threaded nuts 31 on an external screw thread on the shank of the head.

For the purpose of effectively clamping the cutting blades in their slots I provide a series of slits 33 cut into the surface of the head and shown parallel with the slots 21, therefore tangent also to a small circle. Each of these is arranged at the same longitudinal angle as the cutters and each of these is provided with a cylindrical bore slot 34 extending along each from the outer end of the head. When the cutters are adjusted and fixed in position pins 35 are driven into these bores to positively clamp the cutters in place.

It will be seen that the cutters are easily and conveniently adjusted in position by the screw 14 so that they will cut to the proper diameter and the edges 23 can be projected out beyond the head and the ends of the pins 34 and that the cutting blades are firmly held in adjusted position so that they cannot rock or move in any direction. They are easily taken out and replaced and can be sharpened individually or while in position.

Figure 5:
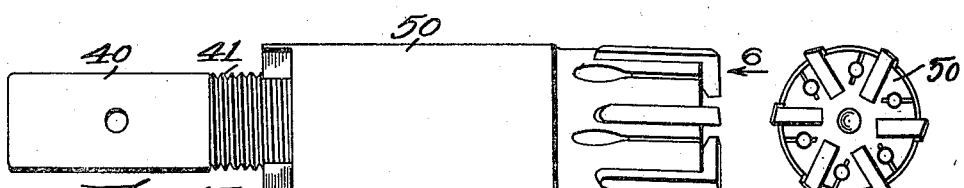
Fig. 5 is a view similar to Fig. 1, showing a modified form.
Figure 6:
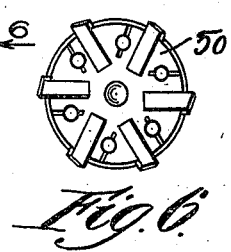
Fig. 6 is an end view of the same.
Figure 7:
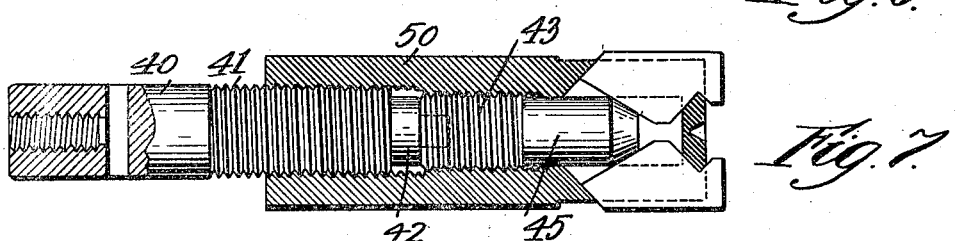
Fig. 7 is a longitudinal central sectional view thereof.
Figure 8:
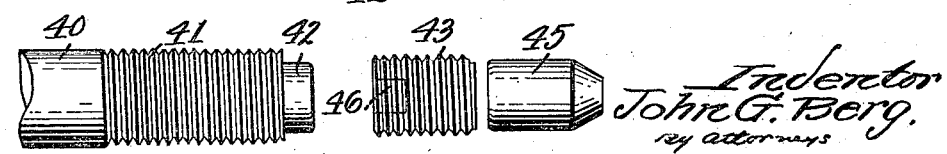
Fig. 8 is a side view of the adjusting cone and associated parts.

In Figs. 5 to 8 I have shown another form in which the cutter can be made. In this case the spindle is provided on the end with a central member 40 which can be considered as the spindle and, in fact, can be made integral with it. This has a screw thread 41 on which is a head 50 similar to the head shown in the first four figures but all in one piece. On the end of this spindle 40 it is provided with a reduced end 42. The head 50 has a smaller bore and yet this part also is screw threaded for receiving a screw plug 43 beyond which is a cone 45 serving the same purpose as the cone 15 as will be obvious. The plug 43 has a polygonal recess 46 so that it can be turned by a wrench for adjustment of the cone. In this case the slanting surfaces which I have not described in detail, but which are the same as those in the other form except that two of them that are located on the head 50, serve the same purpose as they did in that form and the adjustment is comparatively simple. This avoids the necessity of so many parts but, on the other hand, it is not quite so quick to adjust. The other results are the same.

Although I have illustrated and described only two forms of the invention I am aware of the fact that other modifications can be made therein without departing from the scope of the invention as expressed in the claims.

Therefore, I do not wish to be limited to the details of either of the forms shown but what I do claim is:—

1. As an article of manufacture, a milling cutter comprising a head adapted to be mounted on the end of a spindle and having located to rotate therewith two slanting surfaces having the same inclination, a series of cutting blades having correspondingly slanting surfaces engaging the first two slanting surfaces, and a cone adjustable inside the head for engaging an oppositely slanting surface on each cutter blade and adjusting the position thereof.

2. As an article of manufacture, a milling cutter comprising a head having slots therein for receiving a series of cutter blades arranged around the head and having front and side cutting edges, the front cutting edges being in a plane transverse to the axis of the head, and means inside the head for adjusting the position of said cutter blades both longitudinally and radially.

3. As an article of manufacture, a milling cutter comprising a head having slots therein, a series of cutter blades arranged around the head in said slots and having front and side cutting edges, the front cutting edges being in a plane transverse to the axis of the head, and means inside the head for adjusting the position of said cutting blades both longitudinally and radially, the surface on the head which engages the rearmost surface of the cutters being adjustable to clamp them in position.

4. As an article of manufacture, a milling cutter comprising a head mounted on the end of a spindle and having two conical surfaces, one concave and the other convex, and having the same inclination, a series of cutting blades having correspondingly slanting surfaces adapted to be received between the two conical surfaces and provided with two cutting edges at right angles to each other projecting beyond the end and side of the head, a cone adjustable inside the head for engaging an oppositely slanting surface of each cutter blade and adjusting the position thereof, and means in the head for positively rotating said cone with the spindle.

5. As an article of manufacture, a milling cutter comprising a head on a spindle or the like and having a series of nearly radial slots through its sides and extending out through the end, a series of cutter blades in said slots, each having parallel inclined surfaces at its rear and front ends respectively, the former being located farther from the center than the latter and having a third slanting surface transverse to the other two, an adjustable cone inside the head for engaging the last named surfaces of the cutters and determining their position on the head, said head having a series of slits therein, one adjacent to each of said slots and provided with a bore extending along it, and a clamping pin adapted to be driven into each bore to clamp the blades in position.

6. As an article of manufacture, a milling cutter comprising a head adapted to be mounted on a spindle or the like and having a series of nearly radial slots through its sides and extending out from the end, a series of cutter blades located in said slots, said blades each having inclined surfaces, one at its rear end and another near its front end, the former being located farther from the center than the latter and being parallel with each other and having a third slanting surface at an angle to the other two, and an adjustable cone inside the head for engaging the last two surfaces of the cutters and determining their position on the head.

7. As an article of manufacture, a milling cutter blade having side and end cutting edges at right angles to each other, and provided with three slanting surfaces at the rear of said edges for use in clamping and adjusting it, two of the slanting surfaces being parallel.

In testimony whereof I have hereunto affixed my signature.

JOHN G. BERG.